United States Patent [19]

O'Neill et al.

[11] 4,226,839

[45] Oct. 7, 1980

[54] ACTIVATION OF CALCIUM OXIDE AS A SORBENT

[75] Inventors: Eoin P. O'Neill, Mount Merrion, Ireland; Dale L. Keairns, Pittsburgh, Pa.

[73] Assignee: The United States of America as represented by the Administrator of the U.S. Environmental Protection Agency, Washington, D.C.

[21] Appl. No.: 926,925

[22] Filed: Jul. 21, 1978

Related U.S. Application Data

[63] Continuation-in-part of Ser. No. 553,199, Feb. 26, 1975, abandoned.

[51] Int. Cl.³ .............................................. C01F 11/06
[52] U.S. Cl. .................................... 423/177; 423/637
[58] Field of Search ............... 423/175, 177, 635, 637; 432/24

[56] References Cited

U.S. PATENT DOCUMENTS

| 948,045 | 2/1910 | Floyd | 423/637 |
| 1,495,813 | 5/1924 | Shaw et al. | 423/637 |
| 2,370,281 | 2/1945 | Azbe | 423/175 |
| 3,991,172 | 11/1976 | Wicke et al. | 423/637 |

OTHER PUBLICATIONS

EPA-65012-74-001 (Jan. 1974), pp. 59-63.

Primary Examiner—Wayne A. Langel

[57] ABSTRACT

The sorbent capacity of calcium oxide with respect to sulfur dioxide is increased by calcining limestone or dolomite in an atmosphere where the partial pressure of carbon dioxide is greater than 40 percent of the equilibrium partial pressure of carbon dioxide over calcium carbonate at the reaction temperature. Where dolomite is the starting material, it may be calcined in a two-step heating process in which the atmosphere during the first heating stage contains carbon dioxide and the temperature is maintained in the dissociation range of magnesium carbonate ($M_gCO_3$); the atmosphere of the second heating stage also contains carbon dioxide, but the temperature is maintained in the calcium carbonate ($CaCO_3$) dissociation range. Calcium oxide so produced in such an atmosphere of carbon dioxide sufficient to delay calcination is found to have relatively large mouthed pores capable of sorbing increased amounts of sulfur.

10 Claims, 4 Drawing Figures

Run 114, Sulfated 23% in 200 minutes at 815°C in 4% $O_2$ and 0.5% $SO_2$ after calcination at 815°C in $N_2$ (X250)

Run 116, Sulfated 40% in 100 minutes at 815°C in 4% $O_2$ and 0.5% $SO_2$ after controlled calcination at 900°C in 60% $CO_2$ and $N_2$ (X225)

ACTIVATION OF CALCIUM OXIDE AS A SORBENT

FIELD OF THE INVENTION

This is a continuation-in-part of copending application Ser. No. 553,199 filed Feb. 26, 1975, now abandoned, the contents of which are incorporated by reference. The present invention relates to the protection of the environment, and, more particularly, to increasing sorbent capacity of calcium oxide to improve the efficiency of removing sulfur dioxide from gases.

BACKGROUND OF THE INVENTION

Most fossil fuels, and coal almost invariably, contain sulfur contaminants. When these are burned, such as in the fluidized-bed combustion process, the fossil fuels are converted in an oxidized atmosphere to a hot flue gas containing gaseous sulfur contaminants, predominantly in the form of sulfur dioxide. In order to render this flue gas environmentally suitable, the sulfur contaminants of the gas must be reduced by desulfurization.

Evaluation of the fluidized-Bed Combustion Process (EPA Report 650/2-73/048; pb 231 163) describes a typical process for preventing the sulfur contaminants from being released into the flue gas during the conversion of the fossil fuel into the gas. The process employs a fluidized-bed of calcium oxide containing material which acts as a sorbent for the sulfur contaminants by capturing the sulfur contaminants in the form of calcium sulfate. This process may be operated regeneratively or non-regeneratively depending on environmental and economic factors.

The poor efficiency of the usual calcium oxide containing materials to remove sulfur impurities from gases is illustrated by the Moss et al. U.S. Pat. No. 3,617,583 where the sulfur content of the lime used to remove the sulfur gases, in the fuel gasifier, is only 2.4%. It is of considerable significance, therefore, to increase the efficiency of this type of sulfur sorption, particularly in view of the present energy crisis. Thus, the United States has large deposits of sulfur-containing coal which could be put to use to reduce the dependence of the United States on foreign oil, if there were more efficient ways to remove sulfur contamination from the gases evolved by the combustion of such coal.

In the above process the calcium oxide containing materials that are utilized to capture the sulfur contaminants are usually derived from either limestone or dolomite; several methods of calcination have been proposed to achieve this conversion. The standard process is described by Kirk-Othmer, *The Encyclopedia of Chemical Technology*, "Lime and Limestone," Vol. 12, 1967, page 434 and also discussed in U.S. Pat. No. 2,408,647. Kirk-Othmer teaches calcining the limestone or dolomite in a single stage by heating the stones in compliance with the following three essential guides: (1) the stones must be heated to the dissociation temperature of the carbonates; (2) this minimum temperature (but practically, a higher temperature) must be maintained for a certain duration; and (3) the carbon dioxide gas that is evolved must be rapidly removed.

There have also been proposals for multistage calcination processes. U.S. Pat. No. 2,228,618 teaches a two-stage heating process where the temperature of the first stage is lower than that of the second stage and the carbon dioxide generated in both stages is immediately vented from the system.

U.S. Pat. Nos. 3,483,280 and 2,370,281 issued to Einstein et al. and Azbe respectively, propose methods of calcining either limestone or dolomite by multistage heating where generated carbon dioxide is present in the initial burning chamber. Both patents utilize either the carbon dioxide that is obtained by recycling or that is generated in subsequent heating stages to furnish the burning chamber with a substantial amount of optional additional heat, which would otherwise be furnished by greater quantities of fuel gas. Azbe (page 4, col. 2, 11 31-37) cautions against the dangers of recarbonation, i.e. absorption of $CO_2$.

An article by Azbe given on May 28, 1925 (see *Theory and Practice of Lime Manufacture*, pp. 24–26 entitled "Part IV—Judging Kiln Peformance by Gas Analysis") describes good conditions for calcination as shown in chart 3 of FIG. 9 (the far right-hand chart) wherein a $CO_2$ volume percent of a little less than 30% to a little less than 35% is suggested for a batch-fired process, the $CO_2$ dropping to 10% (end of third paragraph, col. 2, page 26).

U.S. Pat. No. 948,045 to Floyd discloses a method of reacting limestone with carbon to produce carbon monoxide and quicklime, i.e. calcined limestone predominantly calcium oxide or hydroxide. The patentees emphasize the absence of $CO_2$ gas pressure in the retorts (pg. 4, l. 23).

Wicke et al. U.S. Pat. No. 3,991,172 discloses the manufacture of what is referred to as "reactive calcium oxide" by decomposing very small particles of calcium carbonate at a temperature of at least 850° C. and under an atmosphere wherein the $CO_2$ partial pressure is not greater than 40%, and most preferably no more than 20%, of the equilibrium partial pressure. The patentees state that "the $CO_2$ partial pressure of the atmosphere must be ... considerably below the equilibrium pressure of the system $CaCO_3$ - reactive CaO." (col. 2, ll. 56–61)

EPA Report 650/2 - 74-001 (January 1974) pp. 59–63 is another example showing conventional calcination of limestone at low $CO_2$ partial pressure. This publication indicates the off-gas concentration of $CO_2$ to have been 21%.

The literature supports the following general conclusions:

(1) Higher temperatures of calcination produce more dense, less reactive CaO.

(2) Higher heating rates before and during calcination produce stones of lower porosity and less reactivity.

(3) Long retention times (heating after complete decomposition of $CaCO_3$), always cause sintering, in air or vacuum.

(4) Impurities increase the sintering of the stone, because of the lower Tammann temperatures which permit diffusion into line cracks and fissures.

(5) Sodium, unlike other impurities, may increase lime reactivity by decreasing shrinkage particularly in stones prone to high shrinkage.

(6) There is disagreement as to the relative importance of temperature and heating rate on lime reactivity. Temperature is probably the more important factor until heating rates get extremely high.

(7) Calcination atmosphere has been shown to affect the structure of CaO. Thus, according to Beruto et al. (*Nature*, Vol. 263, 1976, pp. 221-222) decomposition in vacuo rather than in $N_2$ or air produces a calcine with high internal surface area.

From a review of the prior art it is further apparent that the requirement of using low quantities of $CO_2$ in the calcining atmosphere has been universally followed. Normally the quantity of $CO_2$ has been reduced as much as possible because $CO_2$ in this atmosphere retards calcination and slows down the process, in addition to potentially causing the problems mentioned by Azbe in U.S. Pat. No. 2,370,281.

SUMMARY OF THE INVENTION

It is, accordingly, an object of the invention to overcome the deficiencies of the prior art, such as indicated above.

It is another object to provide the means whereby improved efficiency in removing sulfur from gases is made possible.

It is a further object to provide a method of making an improved calcium oxide containing material capable of sorbing increased amounts of sulfur per unit of material.

Another object is to reduce the quantities of limestone required to lower sulfur dioxide emissions from atmospheric pressure fluidized bed combustors.

It is yet another object to provide a calcium oxide containing material, preferably formed of limestone or dolomite stones, having increased capacity to sorb sulfur from gases, whereby less limestone or dolomite is needed per unit of fossil fuel to maintain the same low level of $SO_2$ emissions in the flue gases after sorbtion by said material.

Another object of the present invention is to provide a process for improving the sorbent capacity with respect to sulfur dioxide, of calcium oxide containing materials that have been prepared from calcined limestone or dolomite.

It is a further object of the invention to prepare a calcium oxide containing material that reduces the total cost of the sorbent; reduces the required capacity of the stone handling equipment; and minimizes the amount of sorbent material needed to accomplish maximum removal of sulfur dioxide either in an oxidized hot gas cleaning process or in a dry lime injection process.

These and other objects and the natures and advantages of the instant invention will be more apparent from the description which follows. It will be especially understood, however, that in particular the present invention greatly improves the efficiency of calcium oxide in the environment of its use to remove sulfur containing gaseous impurities, particularly from combustion gases of sulfur-containing fossil fuels.

In the present invention*, a process is provided for increasing the sorbent capacity with respect to sulfur dioxide of calcium oxide containing materials which are prepared preferably from either limestone or dolomite. Where limestone is the starting material, the process involves calcining the limestone in an atmosphere at which the partial pressure of carbon dioxide is greater than 40 percent of the equilibrium partial pressure of carbon dioxide over calcium carbonate at the reaction temperature. Where dolomite is the starting material, the process involves calcining the dolomite by heating the stone in an atmosphere at which the partial pressure of carbon dioxide is greater than the equilibrium partial pressure of carbon dioxide over calcium carbonate at the reaction temperature and at a temperature below 900° C. After substantially all of the magnesium carbonate fraction has been calcined, the calcium carbonate fraction is calcined by raising the temperature to above 900° C. and ajusting the partial pressure of the carbon dioxide to between 0 and 1 atmospheres.

*See "The Influence of Limestone Calcination on the Utilization of the Sulfur-Sorbent in Atmospheric Pressure Fluid-Bed Combustors" by Ulerich, O'Neill and Keairns; EPRI FP-426, Project 720-1, Final Report, August, 1977, hereby incorporated by reference.

The conditions called for including relative control of both $CO_2$ content of the atmosphere and the temperature, result in the retardation of the calcination with the consequent result that the calcium oxide stones have large mouthed pores which are capable of sorbing considerably more sulfur dioxide than conventionally produced calcium oxide stones.

The stones so produced have particular utility in the fluidized bed combustion of coal for electric power generation. Such process is a direct combustion process for coal with the potential for improved thermal conversion efficiency, reduced costs, and acceptable environmental impact. Using limestone to capture the sulfur in the combustion bed, current EPA new source performance standards (NSPS) for $SO_x$ emissions can be met, but the process as previously practiced requires a >3/1 mole ratio of calcium to sulfur, instead of the theoretical limiting value of 0.9/1. The retarded calcination of the sorbent in carbon dioxide rich atmospheres creates a superior pore-volume distribution in sorbents, so that their capacity for reacting with sulfur dioxide is effectively doubled. With this technique, sulfur penetrates further into lime particles and further into the individual grains of the lime particles. Projected limestone savings and reduction in the quantities of spent sorbent for disposal could be $>2\times 10^5$ tons per annum for a 600 MW plant.

BRIEF DESCRIPTION OF THE DRAWINGS

For a better understanding of the invention, possible embodiments thereof will be described with reference to the attached drawing, it being understood that such embodiments are merely illustrative, wherein.

DESCRIPTION OF THE PREFERRED EMBODIMENTS

As noted above, when limestone is calcined, if forms calcium oxide (lime), a porous material which reacts with sulfur dioxide and air to form calcium sulfate. The sulfur dioxide liberated during coal combustion must be trapped as the gas passes through the particles, e.g. fluidized, of sorbent. To maintain a high efficiency of sulfur capture, the reaction rate between sulfur dioxide and the lime must remain fast. As sulfur builds up in the sorbent, the reaction rate decreases so that sulfur capture becomes less efficient. To maintain a satisfactory level of sulfur capture, fresh limestone must be added to the bed. The rate at which fresh limestone must be added depends on how much sulfur is captured by the sorbent, before its reactivity declines. This decrease in reactivity depends on how porous the sorbent is, and on the type of pores present in the sorbent.

Figure 1A:
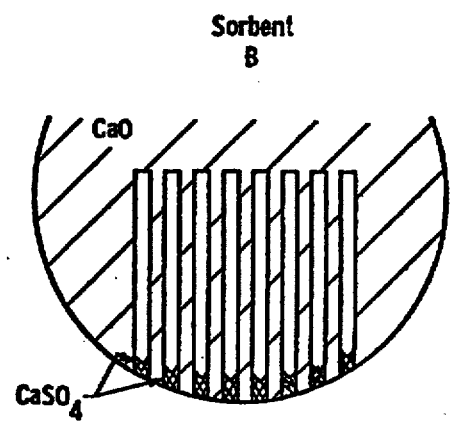
FIG. 1a is a schematic view of the porous structure of calcium oxide formed in a conventional manner.
Figure 1B:
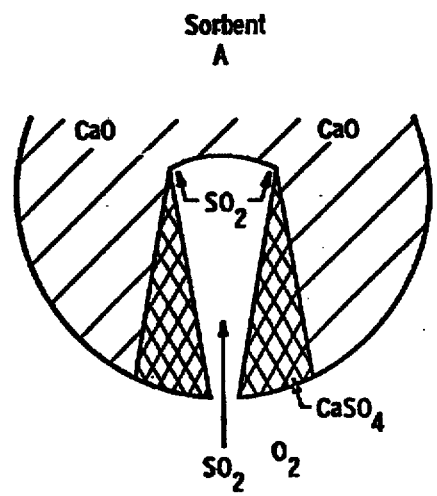
FIG. 1b is a schematic view of the porous structure of calcium oxide formed in accordance with the present invention.

The dependence of rate on the type of pores is schematically illustrated in FIGS. 1a and 1b. Sorbent A in accordance with the invention has wide-mouthed pores of diameter in the range of about 0.1 to 2.0 microns, so that formation of calcium sulfate near the pore mouth does not block access by the sulfur gas to the inner core of the sorbent. Sorbent B in accordance with the prior art has more pores and more pore volume than sorbent A, but most of these pores have narrow mouths of diameter less than about 0.08 microns. To gain access to the inner core of sorbent in sorbent B, the gases must diffuse through the layer of product calcium sulfate which is blocking the pore entrances.

As previously noted, the calcination of the limestone to obtain the desired wide-mouthed pores is performed in a one-step process. This process may be accomplished either in a pretreatment module with the calcined stone being transferred to the desulfurization unit after calcination, or the stone may be calcined in the desulfurization unit simultaneously with the absorbtion of the sulfur contaminants from the fuel gas.

The activation of the calcium oxide containing material is accomplished by delaying the calcination of the stone by utilizing the back pressure of the carbon dioxide in the system and thereby allowing the initially formed fine pores of the CaO containing material to coalesce to form larger pores. These larger pores significantly prevent the blockage of the pore space by the product calcium sulfate layer, which is responsible for sorbent deactivation. To provide this necessary back pressure for activation of the calcium oxide containing material, the calcination should be performed at a partial pressure of $CO_2$ that is between 40 percent and 85 percent the equilibrium partial pressure of $CO_2$ over $CaCO_3$ at the reaction temperature ($P_{CO_2}/P_{eq}=0.4-0.85$). It is preferred that this percentage be greater than 60 percent. The process works best with purer forms of limestone, and may also be satisfactorily used with dolomite.

The temperature of the process, which is related to the partial pressure of $CO_2$, should be within the dissociation temperature range of $CaCO_3$, 760°–950° C., where the preferred temperature is approximately 900° C. Particularly in the case of in-situ calcination, the mean particle size of the limestone, i.e. the size of most of the limestone particles, should be greater than 400 microns, to maintain the bed integrity while the fuel gas is passing through, and less than 2000 microns, preferably less than 1000 microns to insure a commercially reasonable period for calcination.

The total system pressure within the calcination units may be any pressure at which the unit performing the calcination can be safely and economically operated. The residence time will vary with respect to the temperature, particle size, and other system parameters, although in general the desired calcination can be carried out in 40 minutes to 4 hours, preferably 80 minutes to 2 hours. It is not essential that complete calcination should occur in the calcination unit.

The invention further involves the calcination of dolomite to form an activated calcium oxide containing material. The calcination of the dolomite, like the limestone, may be performed either in a pre-treatment module with subsequent transfer of the activated calcium oxide containing material to the desulfurization unit or in the desulfurization unit itself. If the calcination is performed in the desulfurization unit, the dolomite may be injected into the top of the combustion chamber that is separated from the bed by baffle tubes. These baffle tubes provide sufficient residence time for the first stage calcination of the $MgCO_3$ fraction of the stone, prior to the dolomite entrance into the bed.

In the first stage of the two-stage dolomite calcination process, the dolomite is heated in a temperature range of 700°–900° C., the dissociation temperature range of $MgCO_3$ in dolomite, and in an atmosphere where the partial pressure of the $CO_2$ is greater than the equilibrium partial pressure of $CO_2$ over $CaCO_3$ at the reaction temperature. The preferred partial pressure of the $CO_2$ is approximately one atmosphere.

The preferred mean particle size is between 400–2000 microns, most preferably 400–1000μ. Experiments have also shown that 20–40 minutes is a suitable residence period for all of the $MgCO_3$ fraction to substantially calcine in this first stage according to the following equation:

$$MgCO_3.CaCO_3 \rightarrow MgO.CaCO_3 + CO_2$$

This reaction does not chemically affect the $CaCO_3$, but a physical rearrangement does occur which establishes the crystallite size of the $CaCO_3$ in this phase.

The temperature, which in the second stage will be governed by the partial pressure of $CO_2$, is then raised to within the preferred calcium carbonate dissociation temperature range of 900°–950° C. The partial pressure of $CO_2$ is also lowered in this second stage to approximately ½ atmosphere, but as dolomite is more tolerant of $CO_2$ partial pressure than limestone, any pressure between 0 atmospheres and 1.5 atmospheres, depending upon the temperature, would be suitable. The partial pressure of $CO_2$ used in the one-step process, i.e. between 40 and 85% of the equilibrium partial pressure of $CO_2$ over $CaCO_3$ may, of course, suitably be used.

The residence time in this stage is preferably one hour, but it will also vary in accordance with the other system parameters and especially with the amount of $CaCO_3$ that is calcined. Superior results have been obtained when only 10 percent of the $CaCO_3$ is calcined. However, best results are achieved when substantially all of the $CaCO_3$ is calcined according to the following equation:

$$MgO.CaCO_3 \rightarrow MgO.CaO + CO_2$$

Experimental results have demonstrated that when calcination of limestone, utilizing the method of the invention was performed, and conditions corresponded to those where 90 percent of the sulfur contaminants were removed from a given volume of combustion products of fuel gas, 45 percent of the CaO containing material was consistently sulfated. This surpasses the results obtained with the prior art processes where it has been found that upon treatment of a like volume of identical combustion products, only 8–42 percent of the calcium oxide was utilized in order to achieve 90 percent removal of the sulfur contaminant.

Figure 2A:
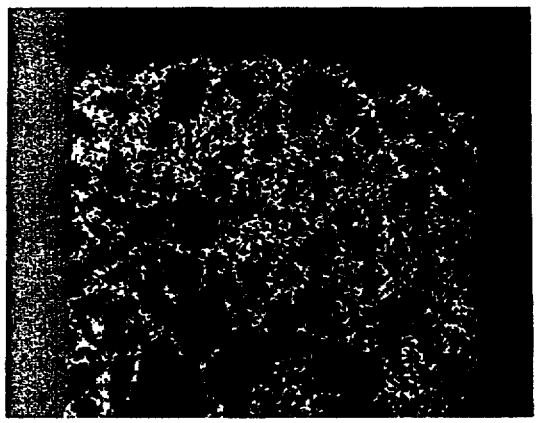
FIG. 2a is a sulfur scan of Lowellville limestone, edge section of 16/18 mesh particle, calcined in nitrogen.
Figure 2B:
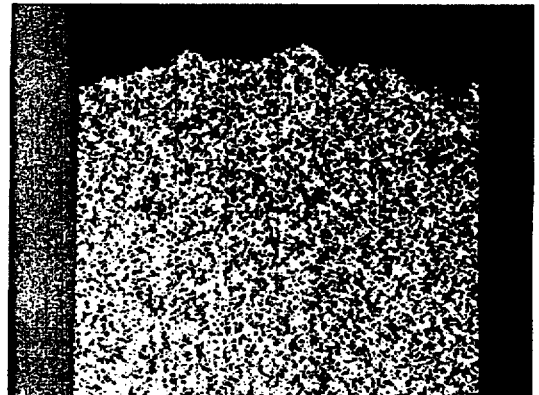
FIG. 2b is a sulfur scan of Lowellville limestone, edge section of 16/18 mesh particle, calcined in 60% $CO_2$ in accordance with the present invention. The white dots show where sulfur is present in the reacted stone.

The result of the $CO_2$ calcination treatment for Lowellville stone can be clearly seen from the photographs, FIGS. 2a and 2b. After calcination in nitrogen, as shown in FIG. 2a, the surface grains are not penetrated by sulfur. After calcination in 60% $CO_2$, the surface grains appear to be completely sulfated. It is apparent that the porosity shift occurs actually within the grains. It thus can be assumed that intergranular pore volume may be sacrificed, as long as the pore volume within the 40 micron grains is shifting to pores of wider diameters.

In general, while the total porosity of the product of the present invention may be less than conventially prepared CaO sorbents, a large number of the pores have a substantially greater pore diameter ranging from 0.1 to 2 microns in comparison with conventional CaO sorbents wherein most of the pores have a pore diameter of less than 0.08 microns. Thus, the calcium oxide portion of the calcium oxide containing material has less than 10% of its pore volume having pores of diameter less than 0.1 microns with most of the pore volume constituting pores of diameter 0.5 to 3 microns.

Similar results have been obtained by calcining dolomite in accordance with the teachings of the present invention. These results have shown that when 90 percent of the sulfur contaminants were removed from a given volume of combustion products, 80–90 percent of the calcium oxide containing material was consistently sulfated. In the prior art methods at least twice as much CaO was required for the removal of 90 percent of the sulfur contaminants, i.e., 42 percent of the CaO was sulfated.

Therefore, the invention has demonstrated significant economical and conservational savings, since only half the amount of stones used in the processes of the prior art need be used in the present invention to achieve removal of an equivalent amount of sulfur contaminants from a fuel gas.

Stones used in obtaining experimental results are identified in Table 1 below:

Table 1

CHEMICAL ANALYSIS OF SORBENTS
% weight

| Stone | Ca | Mg | Na | K | Si | Al | Fe | Acid Insol. | Loss on Calcination |
|---|---|---|---|---|---|---|---|---|---|
| Dolomite 1337[1] | 21.5 | 12.9 | 0.016 | 0.024 | 0.20 | 0.07 | 0.075 | 1.2 | 46.75 |
| Limestone 1359[2] | 38.5 | 0.6 | 0.0022 | 0.046 | 0.27 | 0.12 | 0.19 | 1.4 | 43.84 |
| Lowellville Limestone[3] | 37.3 | 0.45 | 0.012 | 0.076 | 0.86 | 0.37 | 2.51 | 3.5 | 41.83 |

[1] pure dolomite from Ohio
[2] high calcium, high purity limestone from Virginia
[3] fairly pure limestone from Ohio The experimental results were obtained by calcining at various conditions in a thermogravimetric apparatus (TG) or in a fluid bed.

A summary of the sulfur sorption obtained for the relatively pure Table 1 sorbents calcined under different conditions appears in Table 2 below:

Table 2

| | $SO_3$ Pickup (mg/mg Raw Stone) | | | | |
|---|---|---|---|---|---|
| Sorbent | TG, $N_2$ at 815° C. | TG, 15% $CO_2$ at 815° C. | Fluid Bed 15% $CO_2$ at 815° C. | TG, 60% $CO_2$ at 900° C. | Fluid Bed 60% $CO_2$ at 900° C. |
| 1337 | 0.22 | 0.34 | 0.42 | 0.36 | 0.43 |
| Lowellville | 0.13 | 0.18 | 0.22 | 0.29 | 0.32 |
| 1359 | 0.08 | 0.09 | 0.09 | 0.28 | 0.20 |
| Greer | 0.09 | 0.16 | 0.31 | 0.31 | 0.26 |

Comparisons of the extent of sulfation of fluid-bed calcines with similar TG calcines were good for Table 1 materials. The results are summarized below in Table 3.

Table 3

| | | % Sulfation | |
|---|---|---|---|
| Sorbent | Calcination Atmosphere | Fluid-Bed Calcines | TG[a] Calcines |
| Lowellville | 15% $CO_2/N_2$, 815° C. | 30 | 25 |
| Lowellville | 60% $CO_2/N_2$, 900° C. | 38 | 33 |
| 1337 | 15% $CO_2/N_2$, 815° C. | 98 | 80 |
| 1337 | 60% $CO_2/N_2$, 900° C. | 100 | 85[b] |

[a] TG Calcines were nonisothermally calcined up to temperature
[b] isothermally calcined A summary of the sulfation capacity for each sorbent of Table 1 calcined under various environmental conditions, appears below in Table 4.

Table 4

THE SULFATION OF LIMESTONE AND DOLOMITE AS A FUNCTION OF CALCINATION TEMPERATURE AND GAS ATMOSPHERE
(% $CO_2$ = vol. % at 1 atmosphere)

| | TG Calcines (Calcination Conditions) | | | | | | | |
|---|---|---|---|---|---|---|---|---|
| | $N_2$ (815° C.)[a] | | $N_2$ (900° C.) | | 15% $CO_2$ (815° C.) | | 60% $CO_2$ (900° C.) | |
| (6/18 Mesh) | % Util.[*] | $SO_3$ Pickup mg/mg Stone | % Util.[*] | $SO_3$ Pickup mg/mg Stone | % Util.[*] | $SO_3$ Pickup mg/mg Stone | % Util.[*] | $SO_3$ Pickup mg/mg Stone |
| 1359 | 10.2 | 0.089 | 9.1 | 0.07 | 12[a] | 0.12 | 40 | 0.30 |
| | 11.3 | 0.11 | | | | | | |
| | 11.4 | 0.11 | | | | | | |
| Lowellville | 17 | 0.17 | 15.5 | 0.12 | 24.8[a] | 0.20 | 40 | 0.30 |
| | | | | | 23 | 0.19 | 33[a] | 0.28 |
| 1337 | 51 | 0.23 | | | 80[a] | 0.37 | 85 | 0.37 |

| | Fluid Bed Calcines (Calcination Conditions) | | | | | |
|---|---|---|---|---|---|---|
| | $N_2$ (815° C.) | | 15% $CO_2$ (815° C.) | | 60% $CO_2$ (900° C.) | |
| Stone | % Util.[*] | Res. Time/Hours | % Util.[*] | Res. Time/Hours | % Util.[*] | Res. Time/Hours |
| 1359 | 6 | 2 | 12 | 4 | 26 | 2 |
| Lowellville | | | 30 | 4 | 38 | 1.5 |

Table 4-continued
THE SULFATION OF LIMESTONE AND DOLOMITE AS A FUNCTION OF
CALCINATION TEMPERATURE AND GAS ATMOSPHERE
(% $CO_2$ = vol. % at 1 atmosphere)

| 1337 | 98 | 4 | 100 | 1.36 |

*Values given are % utilization when the rate falls below 0.1%/min.
°Nonisothermal calcination (10°/min) up to temperature given.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for producing calcium oxide of increased sorbent capacity with respect to sulfur dioxide which comprises:

heating stones of particle size 400-1000 microns containing calcium carbonate, at about 900° C. for a time sufficient to effect decomposition of the $CaCO_3$ to CaO, in a calcination delaying atmosphere containing carbon dioxide where the partial pressure of the carbon dioxide is greater than 40 percent and up to 85 percent the equilibrium partial pressure of carbon dioxide over calcium carbonate at the reaction temperature, to cause a back pressure of $CO_2$ sufficient to convert initially formed fine pores of CaO to coalesce into larger pores.

2. The method of claim 1 where the stones are limestones.

3. A method in accordance with claim 1, wherein calcination is carried out for 40 minutes to 4 hours.

4. A method in accordance with claim 1 wherein calcination is carried out for 80 minutes to 2 hours.

5. A method in accordance with claim 1 further comprising the subsequent step of recovering the calcium oxide thus produced.

6. A method of producing calcium oxide of increased sorbent capacity with respect to sulfur dioxide from stones of 400-2000 microns particle size containing calcium carbonate and magnesium carbonate, which comprises:

a. heating said stones at 700° up to 900° C. in an atmosphere in which the partial pressure of carbon dioxide is greater than the equilibrium partial pressure of $CO_2$ over $CaCO_3$ at the reaction temperature to calcine the magnesium fraction of the stones; and, b. additionally heating said stones in an atmosphere containing an amount sufficient of carbon dioxide to delay calcination and for a time sufficient to cause sufficient $CO_2$ back pressure to produce large mouthed pores, at a temperature greater than that in step (a) in the range 900°-950° C. for a time sufficient to effect decomposition of the $CaCO_3$ to CaO, the $CO_2$ partial pressure being greater than 40% but not exceeding 85% of the equilibrium partial pressure of $CO_2$ over $CaCO_3$ at the reaction temperature.

7. The method of claim 6 where step (a) is performed until substantially all of the magnesium fraction is calcined and step (b) is performed until substantially all of the calcium fraction is calcined.

8. The method of claim 6 where the temperature in step (a) is in the dissociation temperature range of magnesium carbonate in dolomite and the temperature in step (b) is in the dissociation temperature range of calcium carbonate.

9. The method of claim 6 where the partial pressure of carbon dioxide in step (a) is about 1 atmosphere and in step (b) is about ½ atmosphere.

10. A method in accordance with claim 6 wherein step (b) is carried out for about 1 hour.

* * * * *